UNITED STATES PATENT OFFICE.

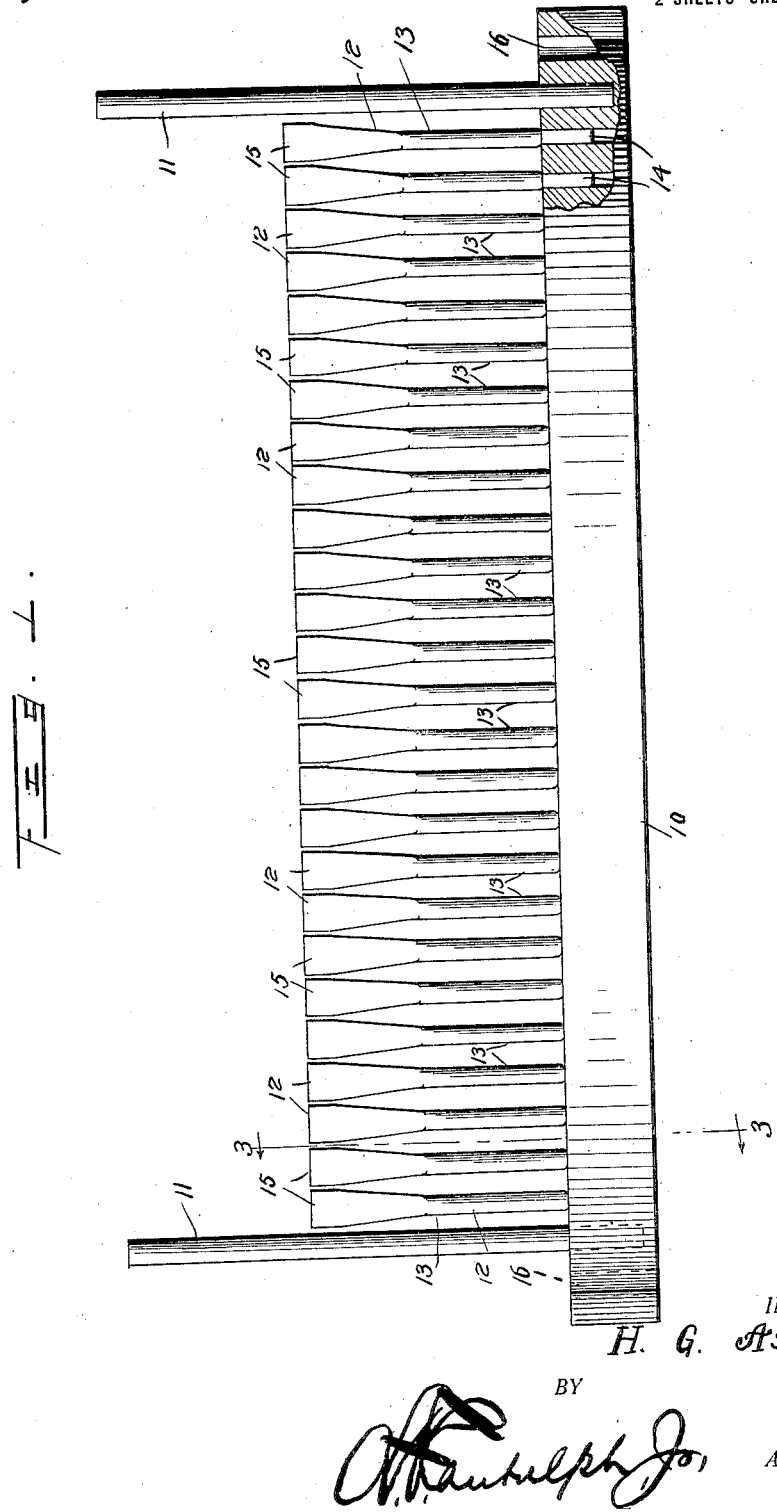

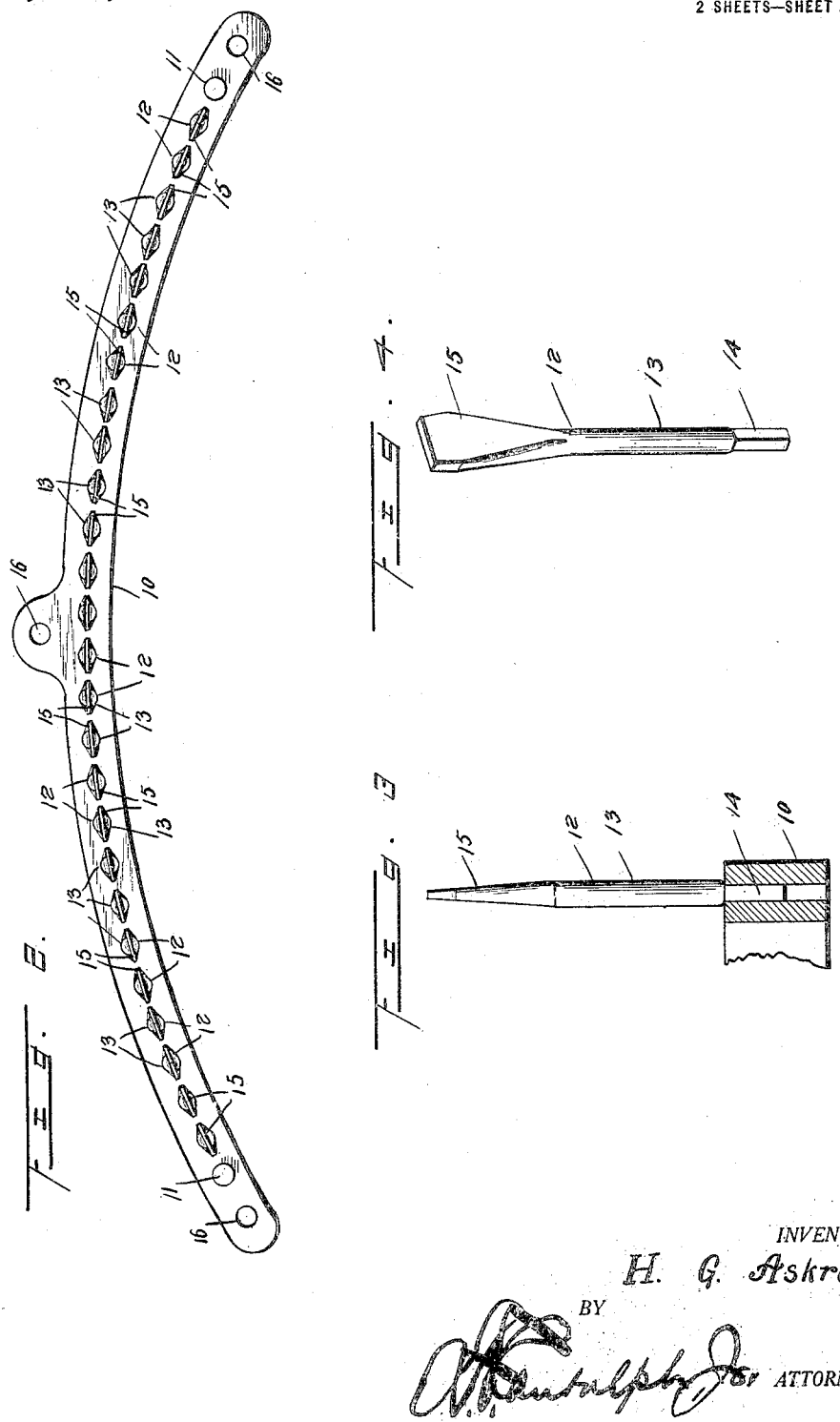

HERMAN G. ASKREN, OF TIPTON, INDIANA.

BROOM-CORN STEMMER AND SEPARATOR.

1,377,796.   Specification of Letters Patent.   Patented May 10, 1921.

Application filed August 4, 1920. Serial No. 401,256.

*To all whom it may concern:*

Be it known that I, HERMAN G. ASKREN, a citizen of the United States, residing at Tipton, in the county of Tipton and State of Indiana, have invented certain new and useful Improvements in Broom-Corn Stemmers and Separators; and I do hereby declare the following to be a full, clear, and exact description of the invention, such as will enable others skilled in the art to which it appertains to make and use the same.

The object of the invention is to provide a simple and efficient means whereby the relatively fine and slender and therefore flexible straws of broom corn adapted for use in broom and brush heads may be separated uniformly and expeditiously from the stems and coarser strands of the products to avoid the tedious and more or less inefficient method of selection or separation by hand as at present practised, and with this object in view the invention consists in a construction and combination of parts of which a preferred embodiment is shown in the drawing, wherein:

Figure 1 is an elevation of an apparatus embodying the invention.

Fig. 2 is a plan view of the same.

Fig. 3 is a vertical transverse section on the plane indicated by the line 3—3 of Fig. 1, showing one of the teeth in edge view.

Fig. 4 is a detail view in perspective of one of the teeth detached.

The device consists essentially of an arcuate base 10 consisting of a bar which may be of Babbitt metal or like material suitable to be produced by molding in a form from a molten state, provided with terminal uprights or stop rods 11 embedded at their lower ends in the terminal portions of the base, and a series of teeth 12 arranged in a series and in an upright position on the base between the terminal uprights or stop rods. The uprights extend above the plane of the upper extremities of the teeth to serve as limiting means for checking the movement of a bunch or handful of straw as it is vibrated or moved transversely over the upper extremities of the series of teeth to permit the slender flexible straws to pass downward between the teeth while the heavier or thicker stems and straws are retained on and supported by the upper ends of the teeth, to be discarded after the completion of the separating operation.

The teeth are preferably constructed of metal having round stems 13, squared or angularly formed at their lower ends as shown at 14 for engagement with suitable sockets in the base bar, in which they may be secured in the course of molding the bar. The upper ends of the teeth are flattened and broadened to form transversely reduced or tapered and longitudinally extended blades 15 of which the widths are arranged in alinement corresponding with the curvature of the arcuate base bar and are spaced apart at their edges a distance determining the thickness of the straws which are desired to pass therebetween, and thus be separated from the thicker straws or stems which are undesirable for use in making broom and brush heads.

The extremities of the blades of the teeth are preferably straight and flat and are arranged in a common plane as indicated in Fig. 1 to form a bearing surface for a bunch or bundle of broom corn which is passed reciprocably thereover in the operation of separating the desirable strands or straws. The base bar is preferably provided with openings 16 for the reception of fastening means such as screws to attach the bar to a suitable table or support in order that the apparatus may be held in a rigid or fixed position during the operation of passing the straws thereover. It will be noted also that the arcuate series or disposition of the teeth serves to facilitate the operation of passing the bunch or bundle of straws over the upper ends thereof by a swinging or oscillatory movement of the hand of the operator, so that all of the straws come in contact with the separating teeth at approximately the same distance from the ends of the straws. In this way a uniform separation of the strands is effected, only those which at substantially the same distance from one end are of the same diameter or are of less diameter than the interval between two adjacent teeth, passing between the teeth and dropping to the surface of the base bar for subsequent removal and incorporation in the construction of the broom or brush head.

Having thus described the invention, what I claim is:

1. A broom corn stemmer and separator having an arcuate series of teeth arranged with their extremities in spaced relation to form intervals for the reception of straws of a predetermined diameter, the terminals of the teeth being arranged in a common plane, and flattened on opposite sides.

2. An apparatus for the purpose described consisting of an arcuate base bar, having means for attachment to a table or support, terminal stop bars carried by said bar, and a series of upright teeth rising from the bar between said stop bars and having terminally flattened blades disposed longitudinally of the series and spaced apart at their edges to form straw receiving intervals.

3. A broom corn stemmer and separator comprising an arcuate base bar, stop bars projecting upwardly from the opposite end portions of said base bar, said base bar having spaced squared openings formed vertically therein throughout its length between said stop bars, and a series of blades having reduced lower ends engaged in said squared openings while their upper ends are flared and flattened on opposite sides.

4. A broom corn stemmer and separator comprising an arcuate base bar, a pair of stop bars projecting upwardly from the opposite end portions of said base bar, and a plurality of blades having flared upper ends beveled on opposite faces to form blade edges turned so as to describe an arc, said blades having reduced lower ends secured in said base bar between said stop bars.

In testimony whereof I affix my signature in presence of two witnesses.

HERMAN G. ASKREN.

Witnesses:
JOHN R. NASH,
H. S. MATTHEWS.